US010696760B2

(12) United States Patent
Ahn et al.

(10) Patent No.: US 10,696,760 B2
(45) Date of Patent: Jun. 30, 2020

(54) METHOD OF PREPARING VINYL CHLORIDE-BASED POLYMER, VINYL CHLORIDE-BASED POLYMER, AND VINYL CHLORIDE-BASED POLYMER COMPOSITION

(71) Applicant: LG CHEM, LTD., Seoul (KR)

(72) Inventors: Seong Yong Ahn, Daejeon (KR); Kun Ji Kim, Daejeon (KR); Se Woong Lee, Daejeon (KR); Hyun Kyou Ha, Daejeon (KR); Seong Jae Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 116 days.

(21) Appl. No.: 15/774,961

(22) PCT Filed: Sep. 5, 2017

(86) PCT No.: PCT/KR2017/009713
§ 371 (c)(1),
(2) Date: May 9, 2018

(87) PCT Pub. No.: WO2018/056611
PCT Pub. Date: Mar. 29, 2018

(65) Prior Publication Data
US 2018/0355078 A1    Dec. 13, 2018

(30) Foreign Application Priority Data

Sep. 26, 2016  (KR) .................. 10-2016-0123388
Sep. 1, 2017   (KR) .................. 10-2017-0112014

(51) Int. Cl.
| C08F 14/06 | (2006.01) |
| C08F 2/02  | (2006.01) |
| C08K 5/524 | (2006.01) |
| C08F 2/44  | (2006.01) |
| C08F 2/01  | (2006.01) |
| C08F 2/00  | (2006.01) |

(52) U.S. Cl.
CPC .............. *C08F 14/06* (2013.01); *C08F 2/001* (2013.01); *C08F 2/02* (2013.01); *C08F 2/44* (2013.01); *C08K 5/524* (2013.01)

(58) Field of Classification Search
CPC .. C08F 14/06; C08F 2/001; C08F 2/02; C08F 2/44; C08F 5/524
USPC ........................................... 526/86
See application file for complete search history.

(56) References Cited

U.S. PATENT DOCUMENTS

| 3,635,928 A * | 1/1972 | Thomas ................. C08J 3/2053 523/333 |
| 9,315,596 B2 | 4/2016 | Ahn et al. |
| 9,382,406 B2 | 7/2016 | Mitamura et al. |
| 2016/0251497 A1 | 9/2016 | Kawamoto et al. |

FOREIGN PATENT DOCUMENTS

| CN | 101466743 A | 6/2009 |
| CN | 103038262 A | 4/2013 |
| CN | 105121542 A | 12/2015 |
| EP | 3061788 A1 | 8/2016 |
| GB | 1463737 A | 2/1977 |
| GB | 1517734 A | 7/1978 |
| GB | 1577030 A | 10/1980 |
| JP | 51-53589 A | 5/1976 |
| JP | 52-78985 A | 7/1977 |
| JP | 06-199911 A | 7/1994 |
| JP | 3067920 B2 | 7/2000 |
| KR | 10-2010-0023340 A | 3/2010 |
| KR | 10-2016-0061126 A | 5/2016 |

* cited by examiner

*Primary Examiner* — William K Cheung
(74) *Attorney, Agent, or Firm* — Dentons US LLP

(57) ABSTRACT

The present invention relates to a method of preparing a vinyl chloride-based polymer, which comprises bulk-polymerizing a vinyl chloride-based monomer in the presence of an initiator (Step 1); and preparing a vinyl chloride-based polymer after the bulk polymerization (Step 2), wherein a phosphite is added in the step 1, a vinyl chloride-based polymer, and a vinyl chloride-based polymer composition comprising the vinyl chloride-based polymer.

13 Claims, No Drawings

1

METHOD OF PREPARING VINYL CHLORIDE-BASED POLYMER, VINYL CHLORIDE-BASED POLYMER, AND VINYL CHLORIDE-BASED POLYMER COMPOSITION

TECHNICAL FIELD

Cross-Reference to Related Application

This application is a National Stage Application of International Application No. PCT/KR2017/009713 filed Sep. 5, 2017, and claims the benefit of Korean Patent Application No. 10-2016-0123388 filed Sep. 26, 2016 and Korean Patent Application No. 10-2017-0112014 filed Sep. 1, 2017, all of which are hereby incorporated by reference in their entirety for all purposes as if fully set forth herein.

Technical Field

The present invention relates to a method of preparing a vinyl chloride-based polymer, a vinyl chloride-based polymer, and a vinyl chloride-based polymer composition, and particularly, to a method of preparing a vinyl chloride-based polymer exhibiting improved thermal stability and transparency by adding a phosphite in a polymerization process, a vinyl chloride-based polymer, and a vinyl chloride-based polymer composition.

BACKGROUND ART

A vinyl chloride-based polymer is a synthetic resin which is used the most among thermoplastic resins. In a polymerization method of a vinyl chloride-based polymer, there are suspension polymerization, emulsion polymerization, and bulk polymerization. Among these, the bulk polymerization is a method in which only a vinyl chloride-based monomer, an initiator, and, as necessary, a reaction additive are supplied and polymerized without use of water and a dispersant (emulsifying agent). The bulk polymerization has advantages in that a device is simple, a reaction is rapid, a yield is high because a purification process comprising distillation, extraction, and the like is not undergone, a polymer with high purity can be obtained, and the polymer can be handled without change.

However, the bulk polymerization has a disadvantage in that it is difficult to adjust a temperature due to generation of a large amount of heat in the polymerization. Also, the bulk polymerization has a disadvantage in that it is difficult to diffuse heat of reaction by conduction or convection because there is no material which is capable of absorbing and removing heat of polymerization other than a vinyl chloride-based monomer and viscosity of a polymerization material increases as the polymerization is progressed. Accordingly, a vinyl chloride-based polymer prepared by the bulk polymerization may be thermally damaged due to heat of reaction generated in a bulk polymerization process or unexpectedly generated heat. Therefore, it is very important to ensure thermal stability of a vinyl chloride-based polymer.

DISCLOSURE

Technical Problem

It is an aspect of the present invention to provide a method of preparing a vinyl chloride-based polymer, which uses a phosphite serving as both a thermal stabilizer and an antioxidant.

In addition, it is another aspect of the present invention to provide a vinyl chloride-based polymer excellent in both thermal stability and transparency and a vinyl chloride-based polymer composition.

Technical Solution

In order to accomplish the above objectives, according to an embodiment of the present invention, there is provided a method of preparing a vinyl chloride-based polymer, which comprises bulk-polymerizing a vinyl chloride-based monomer in the presence of an initiator (Step 1); and preparing a vinyl chloride-based polymer after the bulk polymerization (Step 2), wherein a phosphite is added in the step 1.

In addition, according to another embodiment of the present invention, there is provided a vinyl chloride-based polymer which comprises a phosphite dispersed in a matrix thereof.

Additionally, according to still another embodiment of the present invention, there is provided a vinyl chloride-based polymer composition which comprises the vinyl chloride-based polymer; and at least one selected from the group consisting of a stabilizer, a processing aid, an impact modifier, and a lubricant.

Advantageous Effects

A method of preparing a vinyl chloride-based polymer according to the present invention can minimize thermal damage to a vinyl chloride-based polymer which may occur due to heat unexpectedly generated in a bulk polymerization process in which it is difficult to adjust a temperature by adding a phosphite in a polymerization process. Also, the phosphite can suppress a side reaction of an initiator which may occur in a bulk polymerization process. Accordingly, transparency can be improved by minimizing coloration of a vinyl chloride-based polymer caused by the side reaction, and a bulk polymerization rate can be prevented from being degraded.

In addition, a vinyl chloride-based polymer and a vinyl chloride-based polymer composition including the same according to the present invention can exhibit an improvement in both thermal stability and transparency.

MODE FOR INVENTION

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, a vinyl chloride-based polymer may refer to a polymer in which a phosphite is dispersed in a matrix of a vinyl chloride-based polymer. Specifically, the vinyl chloride-based polymer may refer to a polymer in which, although the vinyl chloride-based polymer and the phosphite are not chemically combined, the phosphite is uniformly dispersed and fixed in a matrix of the vinyl chloride-based polymer, that is, in a three-dimensional network structure, and thus two materials are integrated.

A method of preparing a vinyl chloride-based polymer according to an embodiment of the present invention may comprise bulk-polymerizing a vinyl chloride-based monomer in the presence of an initiator (Step 1), and a phosphite may be added in the step 1.

Specifically, the step 1 may comprise first bulk-polymerizing a first vinyl chloride-based monomer in the presence of a first initiator to prepare nuclear particles (Step 1-1); and second bulk-polymerizing the nuclear particles, a first vinyl chloride-based monomer unreacted in the step 1-1, and a second vinyl chloride-based monomer in the presence of a second initiator (Step 1-2).

The first and second initiators may be the same or different from each other, and each independently, at least one selected from the group consisting of a diacyl peroxide such as dicumyl peroxide, dipentyl peroxide, di(3,5,5-trimethylhexanoyl) peroxide, dilauroyl peroxide, or the like; a peroxycarbonate such as diisopropyl peroxydicarbonate, di-sec-butyl peroxydicarbonate, di(2-ethylhexyl) peroxydicarbonate, or the like; a peroxyester such as t-butyl peroxy neodecanoate, t-butyl peroxy neoheptanoate, t-amyl peroxy neodecanoate, cumyl peroxy neodecanoate, cumyl peroxy neoheptanoate, 1,1,3,3-tetramethylbutyl peroxy neodecanoate, or the like; an azo compound such as azobis-2,4-dimethylvaleronitrile or the like; and a sulfate such as potassium persulfate, ammonium persulfate, or the like.

The first and second vinyl chloride-based monomers may be the same or different from each other, and each independently, a pure vinyl chloride-based monomer or a mixed monomer comprising the pure vinyl chloride-based monomer as a main component and a vinyl-based monomer copolymerizable with the pure vinyl chloride-based monomer. The mixed monomer may comprise the vinyl-based monomer in an amount of 1 to 50 parts by weight with respect to 100 parts by weight of the vinyl chloride-based monomer. The vinyl-based monomer may be at least one selected from the group consisting of an olefin compound such as ethylene, propylene, or the like; a vinyl ester such as vinyl acetate, vinyl propionate, or the like; an unsaturated nitrile such as acrylonitrile or the like; a vinyl alkyl ether such as vinyl methyl ether, vinyl ethyl ether, or the like; an unsaturated fatty acid such as acrylic acid, methacrylic acid, itaconic acid, maleic acid, or the like; and an anhydride of these fatty acids.

The first initiator may be included in an amount of 0.01 to 0.2 parts by weight, particularly 0.03 to 0.15 parts by weight, and more particularly 0.05 to 0.1 parts by weight with respect to 100 parts by weight of the first vinyl chloride-based monomer. When the first initiator is included within the above range, stability of a process in the polymerization is improved.

The second initiator may be included in an amount of 0.03 to 0.6 parts by weight, particularly 0.05 to 0.4 parts by weight, and more particularly 0.08 to 0.3 parts by weight with respect to 100 parts by weight of the nuclear particles, the first vinyl chloride-based monomer unreacted in the step 1-1, and the second vinyl chloride-based monomer. When the second initiator is included within the above range, stability of a process in the polymerization is improved.

The first bulk polymerization may be performed at a temperature of 60 to 80° C. under a pressure of 9 to 14 kg/cm$^2$ G. When the above-described conditions are satisfied, the nuclear particles may be formed from the first vinyl chloride-based monomer. When a polymerization conversion rate is 10% to 15%, the first bulk polymerization may be terminated.

The second bulk polymerization may be performed at a temperature of 50 to 70° C. under a pressure of 7 to 12 kg/cm$^2$ G. When the above-described conditions are satisfied, the nuclear particles may be grown to form a vinyl chloride-based polymer.

Meanwhile, the phosphite may be added in at least one of the step 1-1 and step 1-2. Specifically, in the step 1-1, the phosphite may be added before or during the first bulk polymerization. In the step 1-2, the phosphite may be added before, during, or after the second bulk polymerization. More particularly, the phosphite may be added before the first bulk polymerization in the step 1-1, and may be added before the second bulk polymerization in the step 1-2. The phosphite may be added while stirring is maintained or prior to stirring.

When the phosphite is added in the above-described step, thermal damage to a vinyl chloride-based polymer which may occur due to heat unexpectedly generated in a bulk polymerization process in which it is difficult to adjust a temperature may be prevented. Also, the phosphite may suppress a side reaction caused by an initiator which may occur in the first and second bulk polymerization processes. Accordingly, coloration caused by the side reaction may be minimized, and thus transparency of a vinyl chloride-based polymer which is a final product may be improved. Also, a bulk polymerization rate may not be degraded and may be constantly maintained. In addition, since a product using a vinyl chloride-based polymer is processed at high temperature, it is very important to ensure transparency and thermal stability. When the phosphite is added in a polymerization process of the vinyl chloride-based polymer, the phosphite may reach a matrix of the vinyl chloride-based polymer and thus may be dispersed. Accordingly, a product prepared using a composition comprising the vinyl chloride-based polymer comprising the phosphite according to the preparation method of the present invention may have transparency and thermal stability superior to a product prepared using a composition including the vinyl chloride-based polymer and the phosphite.

The phosphite may be a compound represented by Chemical Formula 1 below.

<Chemical formula 1>

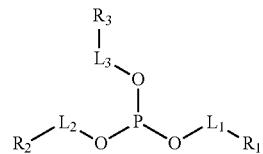

In Chemical Formula 1, $L_1$ to $L_3$ are the same or different from each other, and each independently, are a C1 to C20 alkylene group or a C6 to C20 arylene group, or refer to a direct bonding between O and R1 to R3, respectively, and $R_1$ to $R_3$ are the same or different from each other, and each independently, a substituted or unsubstituted and linear or branched C1 to C20 alkyl group or a substituted or unsubstituted C6 to C20 aryl group.

Here, "direct bonding" means that O and $R_1$ to $R_3$ are directly connected without $L_1$ to $L_3$.

A phosphite represented by Chemical Formula 1 may be one selected from the group consisting of compounds listed in Table 1 below.

TABLE 1
| | Chemical Name | Structural Formula |
|---|---|---|
| 1 | Triethyl phosphite | 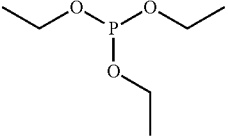 |
| 2 | Triisopropyl phosphite | 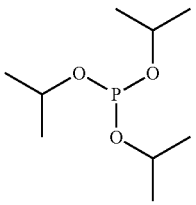 |
| 3 | Triisodecyl phosphite | 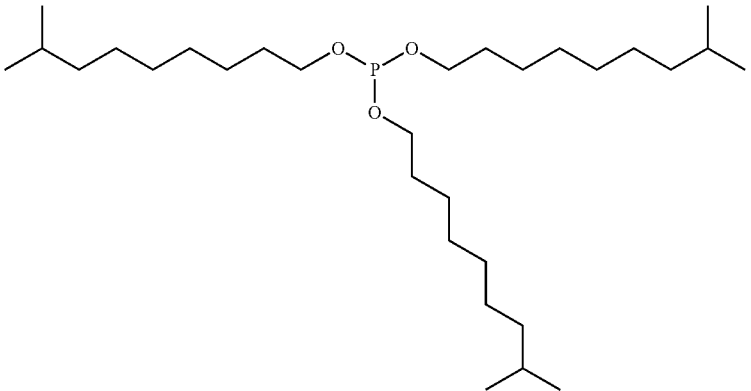 [SMILES: CC(C)CCCCCCCOP(OCCCCCCCC(C)C)OCCCCCCCC(C)C] |
| 4 | Tridodecyl phosphite | 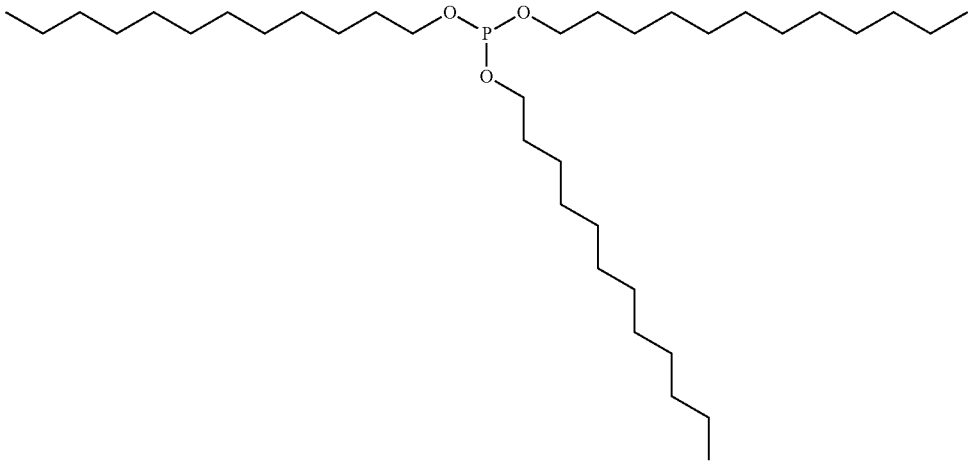 [SMILES: CCCCCCCCCCCCOP(OCCCCCCCCCCCC)OCCCCCCCCCCCC] |
| 5 | Phenyl diisodecyl phosphite | 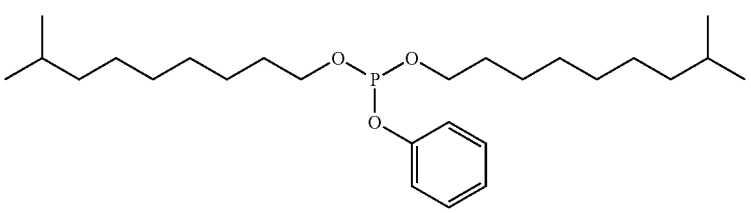 [SMILES: CC(C)CCCCCCCOP(OCCCCCCCC(C)C)Oc1ccccc1] |

TABLE 1-continued
| | Chemical Name | Structural Formula |
|---|---|---|
| 6 | Diphenyl isodecyl phosphite | 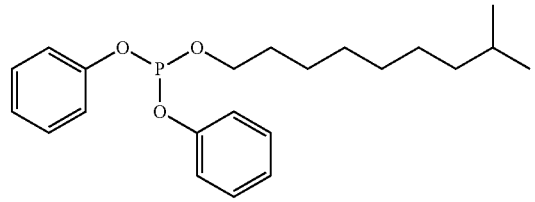 [SMILES: CC(C)CCCCCCCOP(Oc1ccccc1)Oc1ccccc1] |
| 7 | Triphenyl phosphite | 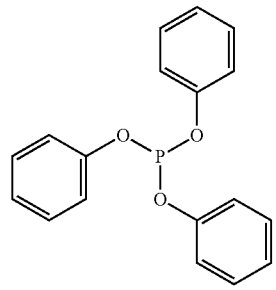 [SMILES: c1ccc(OP(Oc2ccccc2)Oc2ccccc2)cc1] |
| 8 | Phenyl bis(4-nonylphenyl) phosphite | 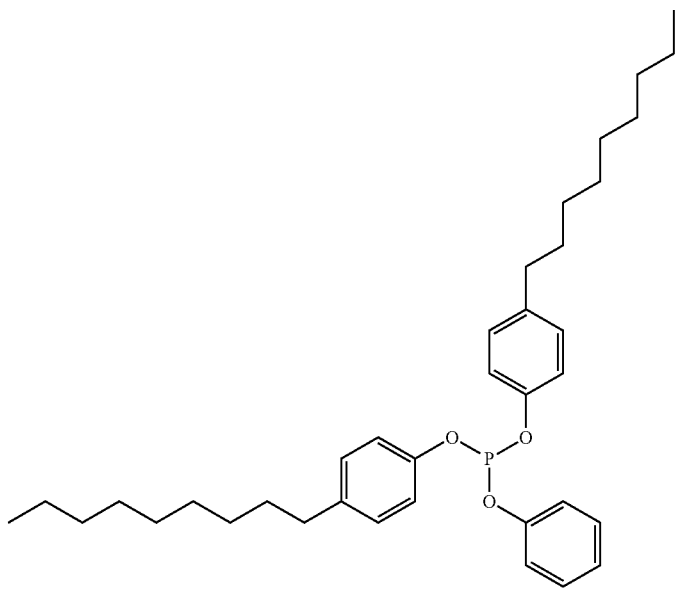 [SMILES: CCCCCCCCCc1ccc(OP(Oc2ccccc2)Oc2ccc(CCCCCCCCC)cc2)cc1] |

TABLE 1-continued

| | Chemical Name | Structural Formula |
|---|---|---|
| 9 | Tris(4-octylphenyl) phosphite | |
| 10 | Tris [(4-1-phenylethyl)phenyl] phosphite | |

The phosphite may be added in an amount of 0.001 to 1 part by weight, particularly 0.003 to 0.1 parts by weight with respect to 100 parts by weight of the first and second vinyl chloride-based monomers. When the phosphite is added within the above range, thermal damage to a vinyl chloride-based polymer which may occur due to heat unexpectedly generated in a bulk polymerization process may be minimized. Since a side reaction caused by the first and second initiators which may occur in the first and second bulk polymerization processes may be suppressed, coloration caused by the side reaction may be minimized, thereby transparency of a vinyl chloride-based polymer which is a final product may be improved. Also, since the side reaction caused by the initiators is suppressed, a bulk polymerization rate may not be degraded and may be constantly maintained.

The phosphite may be added in a state of a solution mixed with a solvent. Also, the phosphite may be included in an amount of 0.1 to 5 wt %, particularly 0.5 to 2 wt % with respect to the total weight of the solution. When the phosphite is added in the above-described state and range, the phosphite may be further uniformly dispersed in the first and second vinyl chloride-based monomers, and thus thermal stability and transparency of a vinyl chloride-based polymer which is a final product may be further improved. The phosphite may be added in one or more selected from the group consisting of the first vinyl chloride-based monomer and the second vinyl chloride-based monomer through a spraying method using a spray or a nozzle. Also, after being added, the phosphite may be dispersed in at least one selected from the group consisting of the first vinyl chloride-based monomer and the second vinyl chloride-based monomer through stirring.

The solvent may be an alcohol solvent which is easily volatilized in a bulk polymerization process, and thus does not affect polymerization. The alcohol solvent may be at least one selected from the group consisting of methanol, ethanol, isopropanol, 1-methoxy propanol, butanol, ethyl hexyl alcohol, and terpineol.

The method of preparing a vinyl chloride-based polymer according to an embodiment of the present invention may comprise obtaining a vinyl chloride-based polymer after the bulk polymerization (Step 2).

In the step 2, when a bulk polymerization conversion rate reaches 50 to 70%, the bulk polymerization may be completed, and a reaction-terminating agent may be added to complete the bulk polymerization.

The reaction-terminating agent is a material which serves to terminate a reaction by causing the loss of function of the second initiator, and may be one or more selected from the group consisting of a phenol compound, an amine compound, a nitrile compound, and a sulfur compound. The phenol compound may be at least one selected from the group consisting of triethylene glycol-bis-3-(3-t-butyl-4-hydroxy-5-methylphenyl)propionate, hydroquinone, p-methoxyphenol, t-butyl-4-hydroxyanisole, n-octadecyl-3-(4-hydroxy-3,5-di-t-butylphenyl)propionate, 2,5-di-t-butylhydroquinone, 4,4'-butylidene-bis(3-methyl-6-t-butyl phenol), t-butylcatechol, 4,4-thiobis(6-t-butyl-m-cresol), and tocopherol. The amine compound may be one or more selected from the group consisting of N,N-diphenyl-p-phenylenediamine and 4,4-bis(dimethylbenzyl)diphenyl. The nitrile compound may be 4-hydroxy-2,2,6,6-tetramethyl-piperidine-1-oxyl. The sulfur compound may be at least one selected from the group consisting of dodecyl mercaptan and 1,2-biphenyl-2-thiol.

When the reaction-terminating agent is added, an additive such as an antioxidant and the like may be added as necessary. The antioxidant may be added for the purpose of making the color of a vinyl chloride-based polymer white.

A vinyl chloride-based polymer according to another embodiment of the present invention may be prepared by the method of preparing a vinyl chloride-based polymer according to an embodiment of the present invention, and may include a vinyl chloride-based polymer and a phosphite, wherein the phosphite may be dispersed in a matrix of the vinyl chloride-based polymer. Specifically, the phosphite may be uniformly dispersed and fixed in a matrix of the vinyl chloride-based polymer, that is, a three-dimensional network structure, and thus two materials are integrated.

The phosphite may be included in an amount of 0.001 to 2 wt %, particularly 0.008 to 1 wt %, and more particularly 0.005 to 0.1 wt % with respect to the total weight of the vinyl chloride-based polymer. The phosphite is hardly lost in the preparation process of the vinyl chloride-based polymer, and particularly, 90% or more of a phosphite added in the preparation process of the vinyl chloride-based polymer may be included in the polymer. Accordingly, the phosphite may be included within the above range with respect to the total weight of the vinyl chloride-based polymer. When the phosphite is included within the above range, the phosphite is not lost in the preparation process of the vinyl chloride-based polymer, and performance of the vinyl chloride-based polymer is not degraded, thereby a vinyl chloride-based polymer excellent in both thermal stability and transparency may be provided.

A vinyl chloride-based polymer composition according to still another embodiment of the present invention may include the vinyl chloride-based polymer and at least one selected from the group consisting of a stabilizer, a processing aid, an impact modifier, and a lubricant.

The stabilizer is a material which increases stability with respect to heat to prevent coloration and decomposition, and may be a metallic stabilizer or an organic acid metal salt stabilizer. The metallic stabilizer may be at least one selected from the group consisting of a lead-based stabilizer, a (organic) tin-based stabilizer, a cadmium-based stabilizer, and a barium-based stabilizer. The organic acid metal salt may be a carboxylic acid, organic phosphoric acid, or phenol metal salt. The carboxylic acid may be at least one selected from the group consisting of caproic acid, caprylic acid, pelargonic acid, 2-ethylhexyl acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenyl stearic acid, ricinoleic acid, linoleic acid, linolenic acid, oleic acid, arachic acid, behenic acid, erucic acid, brassidic acid, pseudo acids, resin fatty acids, coconut oil fatty acids, tung oil fatty acids, soybean oil fatty acids, cotton seed oil fatty acids, benzoic acid, p-t-butylbenzoic acid, ethylbenzoic acid, isopropylbenzoic acid, toluic acid, xylic acid, salicylic acid, 5-t-octylsalicylic acid, naphthenic acid, and cyclohexanecarboxylic acid. The organic phosphoric acid may be at least one selected from the group consisting of monooctyl phosphate, dioctyl phosphate, monododecyl phosphate, didodecyl phosphate, monooctadecyl phosphate, dioctadecyl phosphate, mono(nonylphenyl) phosphate, di(nonylphenyl) phosphate, phosphonic acid nonylphenyl ester, and phosphonic acid stearyl ester. The phenol may be at least one selected from the group consisting of phenol, cresol, ethylphenol, cyclohexylphenol, nonylphenol, and dodecylphenol. The metal salt may be a neutral salt, an acidic salt, a basic salt, or an overbased complex.

The processing aid is a material which promotes gelation of a vinyl chloride-based polymer, and may be a homopolymer or a copolymer of alkyl methacrylate such as methyl methacrylate, ethyl methacrylate, butyl methacrylate, or the like; a copolymer of the alkyl methacrylate and an alkyl acrylate such as methyl acrylate, ethyl acrylate, butyl acrylate, or the like; a copolymer of the alkyl methacrylate and an aromatic vinyl compound such as styrene, α-methyl styrene, vinyltoluene, or the like; or a copolymer of the alkyl methacrylate and a vinyl cyanide compound such as acrylonitrile, methacrylonitrile, or the like. The processing aid may be used in combination of one or two or more thereof.

The impact modifier is a material which imparts elasticity to a vinyl chloride-based polymer to reinforce impact resistance, and may be at least one selected from the group consisting of a methyl methacrylate-butadiene styrene (MBS)-based polymer, a chlorinated polyethylene-based copolymer, an ethylene vinyl acetate-based polymer, an acrylic polymer, and a butadiene-based polymer.

The lubricant is a material which improves processability and interfacial properties of a vinyl chloride-based polymer, and may be a hydrocarbon-based lubricant such as low-molecular-weight wax, paraffin wax, polyethylene wax, a chlorinated hydrocarbon, fluorocarbon, or the like; a natural wax-based lubricant such as carnauba wax, candelilla wax, or the like; a fatty acid-based lubricant such as a higher fatty acid (e.g., lauric acid, stearic acid, behenic acid, or the like), an oxygenated fatty acid (e.g, hydroxystearic acid), or the like; an aliphatic amide-based lubricant such as an aliphatic amide compound (e.g, stearylamide, laurylamide, oleylamide, or the like), an alkylene bis aliphatic amide compound (e.g., methylene bis stearylamide and ethylene bis stearylamide) or the like; a alcohol ester-based lubricant of fatty acids such as a monohydric alcohol ester compound of fatty acids (e.g., stearyl stearate, butyl stearate, distearyl phthalate, or the like), a polyhydric alcohol ester compound of fatty acid (e.g., glycerin tristearate, sorbitan tristearate, pentaerythritol tetrastearate, dipentaerythritol hexastearate, polyglycerin polyricinoleate, hydrogenated castor oil, or the like), a composite ester compound of a monobasic fatty acid such as adipic acid•stearic acid ester of dipentaerythritol, a polybasic organic acid, and a polyhydric alcohol, or the like; an aliphatic alcohol-based lubricant such as stearyl alcohol, lauryl alcohol, palmityl alcohol, or the like; metal soap; a montanic acid-based lubricant such as partially saponified montanic acid ester or the like; an acrylic lubricant; or a silicone oil. The lubricant may be used alone or in combination of two or more.

BEST MODE

Hereinafter, preferred embodiments of the present invention will be described in order to aid in understanding the present invention. However, it is apparent to those skilled in the art that the description proposed herein is just a preferable example for the purpose of illustration only, and is not intended to limit or define the scope of the invention. Therefore, it should be understood that various changes and modifications can be made to the exemplary embodiments of the present invention without departing from the scope of the present invention, so that the present invention covers all such changes and modifications provided they are within the scope of the appended claims and their equivalents.

<Preparation of Vinyl Chloride-Based Polymer>

Examples 1-1 and 1-2 and Comparative Examples 1-1 and 1-2

A polymerization device comprising a 0.2 m³ preliminary polymerization reactor, a 0.5 m³ polymerization reactor, a reflux condenser which is connected to the polymerization reactor and controls a polymerization temperature, and a pipe for recovering vinyl chloride which is connected to the reflux condenser and releases an unreacted vinyl chloride-based monomer was used to polymerize a vinyl chloride-based monomer as follows.

140 kg of a vinyl chloride monomer and 85 g of t-butyl peroxy neodecanoate as an initiator were sequentially added to the preliminary polymerization reactor which is degassed so as to be in a high vacuum, and stirred. While the stirring was maintained, a pressure of the preliminary polymerization reactor increased to 12 kg/cm² G, and first bulk polymerization was performed at 75° C. to prepare nuclear particles. In this case, a conversion rate of the first bulk polymerization was 10%.

Subsequently, to the polymerization reactor, all of the nuclear particles, all of a vinyl chloride monomer unreacted in the first bulk polymerization, 80 kg of an additional vinyl chloride monomer, and 200 g of 1,1,3,3-tetramethylbutyl peroxy neodecanoate as an initiator were sequentially added and stirred. While the stirring was maintained, polymerization was initiated under conditions of a temperature and a pressure listed in Table 2 below, and second bulk polymerization was performed for a time listed in Table 2 below. When a polymerization conversion rate listed in Table 2 below was reached, a phosphite solution listed in Table 3 below and 200 g of butylated hydroxytoluene as an antioxidant were sequentially added, and then a residual unreacted monomer was recovered in a vacuum while stirring was maintained to obtain a vinyl chloride-based polymer.

TABLE 2

| Classification | Polymerization temperature (° C.) | Polymerization pressure (kg/cm² G) | Polymerization conversion rate (%) | Polymerization time (min) |
| --- | --- | --- | --- | --- |
| Example 1-1 | 52 | 7.5 | 55 | 180 |
| Example 1-2 | 60 | 9.0 | 60 | 200 |
| Comparative Example 1-1 | 52 | 7.5 | 55 | 180 |
| Comparative Example 1-2 | 90 | 9.0 | 60 | 200 |

TABLE 3

| Classification | Phosphite | | Solvent | | Total weight (kg) |
| --- | --- | --- | --- | --- | --- |
| | Type | Content (wt %) | Type | Content (wt %) | |
| Example 1-1 | Triphenyl phosphite | 1 | Ethanol | 99 | 1 |
| Example 1-2 | Tridodecyl phosphite | 1 | Ethanol | 99 | 10 |
| Comparative Example 1-1 | — | — | — | — | — |
| Comparative Example 1-2 | — | — | — | — | — |

Examples 1-3 and 1-4

A polymerization device comprising a 0.2 m³ preliminary polymerization reactor, a 0.5 m³ polymerization reactor, a reflux condenser which is connected to the polymerization reactor and controls a polymerization temperature, and a pipe for recovering vinyl chloride which is connected to the reflux condenser and releases an unreacted vinyl chloride-based monomer was used to polymerize a vinyl chloride-based monomer as follows.

140 kg of a vinyl chloride monomer, 85 g of t-butyl peroxy neodecanoate as an initiator, and a solution listed in Table 4 below were sequentially added to the preliminary polymerization reactor which is degassed so as to be in a high vacuum, and stirred. While the stirring was maintained, a pressure of the preliminary polymerization reactor increased to 12 kg/cm² G, and first bulk polymerization was performed at 75° C. to prepare nuclear particles. In this case, a conversion rate of the first bulk polymerization was 10%.

Subsequently, to the polymerization reactor, all of the nuclear particles, all of a vinyl chloride monomer unreacted in the first bulk polymerization, 80 kg of an additional vinyl chloride monomer, and 200 g of 1,1,3,3-tetramethylbutyl peroxy neodecanoate as an initiator were sequentially added and stirred. While the stirring was maintained, second bulk polymerization was performed at a temperature of 52° C. under a pressure of 7.5 kg/cm² G for a time listed in Table 4 below. In this case, a polymerization conversion rate was 55%. 200 g of butylated hydroxytoluene as an antioxidant was added, and then a residual unreacted monomer was recovered in a vacuum while stirring was maintained to obtain a vinyl chloride-based polymer.

TABLE 4

| Classification | Polymerization time (min) | Phosphite Type | Phosphite Content (wt %) | Solvent Type | Solvent Content (wt %) | Total weight (kg) |
|---|---|---|---|---|---|---|
| Example 1-3 | 180 | Phenyl-bis(4-nonylphenyl) phosphite | 1 | Ethanol | 99 | 1 |
| Example 1-4 | 200 | Tris(4-octylphenyl) phosphite | 1 | Ethanol | 99 | 3 |

Comparative Example 1-3

A polymerization device including a 1 m³ polymerization reactor, a reflux condenser which is connected to the polymerization reactor and controls a polymerization temperature, and a pipe for recovering vinyl chloride which is connected to the reflux condenser and releases an unreacted vinyl chloride-based monomer was used to polymerize a vinyl chloride-based monomer as follows.

First, 390 kg of deionized water was added in the polymerization reactor, and 150 g of polyvinyl alcohol (degree of hydration: 78.5%), 100 g of polyvinyl alcohol (degree of hydration: 40.7%), and 30 g of hydroxypropyl methylcellulose all together were added as a dispersant. Subsequently, 300 kg of a vinyl chloride-based monomer was added, and 30 g of di-(2-ethylhexyl)peroxydicarbonate and 120 g of t-butylperoxy neodecarbonate were added as an initiator. Polymerization was performed while an inner temperature of the polymerization reactor was maintained at 57° C. When a polymerization rate reached 60%, 30 kg of a solution comprising 1 wt % triphenyl phosphate (solvent: ethanol) was injected using a pump. When an inner pressure of the polymerization reactor reached 6.3 kg/cm², 15 g of 4-hydroxy-2,2,6,6-tetramethyl-piperidine-1-oxyl as a reaction-terminating agent, 60 g of triethylene glycol-bis-3-(3-t-butyl-4-hydroxy-5-methylphenyl)propionate as an antioxidant were sequentially added. Afterward, an unreacted monomer was recovered, and the polymerization was terminated, thereby obtaining a first polymer slurry. Subsequently, the first polymer slurry was recovered, and stripping and dehydrating processes were performed to separate an unreacted vinyl chloride-based monomer and water, thereby obtaining a second polymer slurry. The second polymer slurry was hot-air dried in a fluid bed dryer at 60° C. to separate residual water. Afterward, a vinyl chloride-based polymer in the form of powder was obtained through a screening facility. A content of a phosphite in the vinyl chloride-based polymer thus obtained was measured, but measurement was not possible because the phosphite was already hydrolyzed.

<Preparation of Sheet>

Examples 2-1 to 2-4 and Comparative Examples 2-1 to 2-4

100 parts by weight of a vinyl chloride-based polymer listed in Table 5 below, 2 parts by weight of a mono/dimethyl tin mercaptide composite as a tin-based stabilizer, 1 part by weight of an acryl and methyl methacrylate (MMA) composite as a processing aid, 5 parts by weight of a methyl methacrylate (MMA) and butadiene composite as an impact modifier, 0.5 parts by weight of composite of a fatty acid ester and wax as a lubricant, and an additive listed in Table 5 below were blended and mixed using a rolling mill at 185° C. for 3 minutes, thereby obtaining a preliminary sheet having a thickness of 0.5 mm. The preliminary sheet was cut, and then ten cut sheets were stacked one on top of the other and compressed all at once, thereby preparing a sheet having a thickness of 6 mm.

TABLE 5

| Classification | Vinyl chloride-based polymer | Additive Type | Additive Content (parts by weight) |
|---|---|---|---|
| Example 2-1 | Example 1-1 | — | — |
| Example 2-2 | Example 1-2 | — | — |
| Example 2-3 | Example 1-3 | — | — |
| Example 2-4 | Example 1-4 | — | — |
| Comparative Example 2-1 | Comparative Example 1-1 | — | — |
| Comparative Example 2-2 | Comparative Example 1-2 | — | — |
| Comparative Example 2-3 | Comparative Example 1-1 | Triphenyl phosphite | 1 |
| Comparative Example 2-4 | Comparative Example 1-3 | — | — |

Examples 3-1 to 3-4 and Comparative Examples 3-1 to 3-4

100 parts by weight of a vinyl chloride-based polymer listed in Table 6 below, 4 parts by weight of a mono/dimethyl tin mercaptide composite as a tin-based stabilizer, 1 part by weight of an acryl and methyl methacrylate (MMA) composite as a processing aid, 6 parts by weight of a methyl methacrylate (MMA) and butadiene composite as an impact modifier, 0.5 part by weight of composite of a fatty acid ester and wax as a lubricant, and an additive listed in Table 6 below were blended and mixed using a rolling mill at 185° C. for 3 minutes, thereby obtaining a preliminary sheet having a thickness of 0.5 mm. The preliminary sheet was cut, and ten cut sheets were stacked one on top of the other, put into a frame having a thickness of 3 mm, and compressed all at once. Then, the compressed sheets were preheated at 185° C. for 2 minutes, heated at 185° C. for 3 minutes under a pressure of 10 kg/cm2, and cooled at 185° C. for 2 minutes under a pressure of 15 kg/cm², thereby preparing a sheet having a thickness of 3 mm

TABLE 6

| Classification | Vinyl chloride-based polymer | Additive Type | Additive Content (parts by weight) |
|---|---|---|---|
| Example 3-1 | Example 1-1 | — | — |
| Example 3-2 | Example 1-2 | — | — |
| Example 3-3 | Example 1-3 | — | — |
| Example 3-4 | Example 1-4 | — | — |
| Comparative Example 3-1 | Comparative Example 1-1 | — | — |
| Comparative Example 3-2 | Comparative Example 1-2 | — | — |
| Comparative Example 3-3 | Comparative Example 1-1 | Triphenyl phosphite | 1 |
| Comparative Example 3-4 | Comparative Example 1-3 | — | — |

Experimental Example 1

<Measurement of Haze Rate and Transmission Rate>

The haze rate and transmission rate of each of the sheets according to Examples 2-1 to 2-4 and Comparative Examples 2-1 to 2-4 were measured using Haze-gard plus commercially available from BYK-Gardner GmbH, results of which are shown in Table 7 below.

Haze rate: defined as percentage of light that passes through a sample with respect to initially radiated beam (as a larger amount of light passes through a sample, the haze rate is lower, which means better transparency)

Transmission rate: inversely proportional to haze rate

TABLE 7

| Classification | Haze rate (%) | Transmission rate (%) |
| --- | --- | --- |
| Example 2-1 | 6.6 | 86.5 |
| Example 2-2 | 7.0 | 85.5 |
| Example 2-3 | 6.8 | 85.9 |
| Example 2-4 | 7.1 | 85.0 |
| Comparative Example 2-1 | 10.5 | 77.6 |
| Comparative Example 2-2 | 10.7 | 77.1 |
| Comparative Example 2-3 | 8.5 | 83.0 |
| Comparative Example 2-4 | 10.6 | 76.4 |

Referring to Table 7, it can be seen that the sheets according to Examples 2-1 to 2-4 had a haze rate of 6.6% to 7.1% and a transmission rate of 85.0% to 86.5%, indicating excellent transparency.

However, it can be seen that the sheets according to Comparative Examples 2-1 and 2-2 had a haze rate of 10.5% and 10.7% and a transmission rate of 77.6% and 77.1%, indicating transparency lower than that of the sheets according to Examples 2-1 to 2-4. Also, it can be seen that the sheet according to Comparative Example 2-3 had a higher haze rate and a lower transmission rate compared to those of the sheets according to Examples 2-1 to 2-4, and exhibited a decrease in transparency because, although a content of a phosphite in the sheet was similar to that of a sheet prepared using the vinyl chloride-based polymer according to the present invention, a phosphite was not dispersed in a matrix of a vinyl chloride-based polymer. In addition, it can be seen that the sheet according to Comparative Example 2-4 exhibited an increase in haze rate and a decrease in transmission rate, like a sheet prepared using a vinyl chloride-based polymer not comprising a phosphite.

Experimental Example 2

<Evaluation and Measurement of Thermal Stability>

In order to evaluate thermal stability of each of the sheets according to Examples 3-1 to 3-4 and Comparative Examples 3-1 to 3-4, a whiteness index (W.I) was measured using NR-3000 commercially available from Nippon Denshoku Industries Co., Ltd., results of which are shown in Table 8 below. Generally, thermal stability can be evaluated from a whiteness index, and a higher whiteness index indicates excellent thermal stability.

TABLE 8

| Classification | Whiteness index |
| --- | --- |
| Example 3-1 | 32.90 |
| Example 3-2 | 32.45 |
| Example 3-3 | 32.10 |
| Example 3-4 | 31.80 |
| Comparative Example 3-1 | 23.50 |
| Comparative Example 3-2 | 23.00 |
| Comparative Example 3-3 | 28.30 |
| Comparative Example 3-4 | 28.00 |

Referring to Table 8, it can be seen that the sheets according to Examples 3-1 to 3-4 had a whiteness index of 31.80 to 32.90, indicating excellent thermal stability. On the other hand, it can be seen that the sheets according to Comparative Examples 3-1 and 3-2 had a whiteness index of 23.5 and 23, indicating thermal stability lower than that of the sheets according to Examples 3-1 to 3-4. Also, it can be seen that the sheet according to Comparative Example 3-3 had a whiteness index lower than that of the sheets according to Examples 3-1 to 3-4.

It can be seen that the sheet according to Comparative Example 3-3 exhibited a decrease in thermal stability because, although a content of a phosphite in the sheet was similar to that of a sheet prepared using the vinyl chloride-based polymer according to the present invention, a phosphite was not dispersed in a matrix of a vinyl chloride-based polymer. Also, it can be seen that the sheet according to Comparative Example 3-4 exhibited a decrease in whiteness index, like a sheet prepared using a vinyl chloride-based polymer not comprising a phosphite. Although the sheet according to Comparative Example 3-4 exhibited an excellent whiteness index compared to that of the sheets according to Comparative Examples 3-1 and 3-2, it is just due to a difference in a polymerization method and is not significant.

The invention claimed is:

1. A method of preparing a vinyl chloride-based polymer comprising:

bulk-polymerizing a vinyl chloride-based monomer in the presence of an initiator (Step 1); and preparing a vinyl chloride-based polymer after the bulk polymerization (Step 2), wherein a phosphite is added in the step 1.

2. The method of claim 1, wherein the step 1 comprises:

first bulk-polymerizing a first vinyl chloride-based monomer in the presence of a first initiator to prepare nuclear particles (Step 1-1); and second bulk-polymerizing the nuclear particles, a first vinyl chloride-based monomer unreacted in the step 1-1, and a second vinyl chloride-based monomer in the presence of a second initiator (Step 1-2), wherein the phosphite is added in at least one step of the step 1-1 and step 1-2.

3. The method of claim 2, wherein the first bulk polymerization is performed at a temperature of 60 to 80° C. under a pressure of 9 to 14 kg/cm² G.

4. The method of claim 2, wherein the second bulk polymerization is performed at a temperature of 50 to 70° C. under a pressure of 7 to 12 kg/cm² G.

5. The method of claim 1, wherein the phosphite is a compound represented by Formula 1 below:

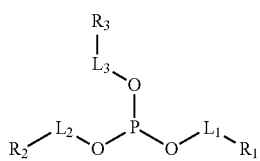

<Formula 1> wherein $L_1$ to $L_3$ are the same or different from each other, and each independently a C1 to C20 alkylene group or a C6 to C20 arylene group, or refer to a direct bonding between O and R1 to R3, respectively, and $R_1$ to $R_3$ are the same or different from each other, and each independently, a substituted or unsubstituted and linear or branched C1 to C20 alkyl group or a substituted or unsubstituted C6 to C20 aryl group.

6. The method of claim 5, wherein the phosphite is one or two or more selected from the group consisting of triethyl phosphite, triisopropyl phosphite, triisodecyl phosphite, tridodecyl phosphite, phenyl diisodecyl phosphite, diphenyl isodecyl phosphite, triphenyl phosphite, phenyl bis(4-nonylphenyl) phosphite, tris(4-octylphenyl) phosphite, and tris((4-1-phenylethyl)phenyl) phosphite.

7. The method of claim 1, wherein the phosphite is added in an amount of 0.001 to 1 part by weight with respect to 100 parts by weight of the vinyl chloride-based monomer.

8. The method of claim 1, wherein the phosphite is added in a state of a solution mixed with a solvent.

9. The method of claim 1, wherein the phosphite is dispersed in a matrix of the vinyl chloride-based polymer.

10. The method of claim 9, wherein the phosphite is dispersed and fixed in a three-dimensional network structure of the vinyl chloride-based polymer.

11. A vinyl chloride-based polymer prepared by the method of claim 1 comprising a phosphite dispersed in a matrix of the vinyl chloride-based polymer.

12. The vinyl chloride-based polymer of claim 11, wherein the phosphite is included in an amount of 0.001 to 2 wt % with respect to a total weight of the vinyl chloride-based polymer.

13. A vinyl chloride-based polymer composition comprising:
the vinyl chloride-based polymer of claim 11; and
at least one selected from the group consisting of a stabilizer, a processing aid, an impact modifier, and a lubricant.

* * * * *